US007268318B2

United States Patent
Ikeda et al.

(10) Patent No.: US 7,268,318 B2
(45) Date of Patent: Sep. 11, 2007

(54) WELDING EQUIPMENT

(75) Inventors: Tatsuya Ikeda, Kawanishi (JP); Yasuzo Tsuchiya, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 225 days.

(21) Appl. No.: 10/546,233

(22) PCT Filed: Dec. 16, 2004

(86) PCT No.: PCT/JP2004/018787

§ 371 (c)(1),
(2), (4) Date: Aug. 18, 2005

(87) PCT Pub. No.: WO2005/084868

PCT Pub. Date: Sep. 15, 2005

(65) Prior Publication Data

US 2007/0000891 A1 Jan. 4, 2007

(30) Foreign Application Priority Data

Mar. 8, 2004 (JP) ............ P. 2004-063534

(51) Int. Cl.
*B23K 9/095* (2006.01)
(52) U.S. Cl. .................................. 219/130.1
(58) Field of Classification Search ............ 219/130.1, 219/130.31, 130.32, 130.33, 130.5, 132; 228/102, 103
See application file for complete search history.

(56) References Cited

U.S. PATENT DOCUMENTS

| 4,721,947 | A | * | 1/1988 | Brown ................... 228/103 |
| 4,883,938 | A | | 11/1989 | Sarugaku |
| 6,107,601 | A | | 8/2000 | Shimogama |
| 6,384,375 | B1 | * | 5/2002 | Hongu et al. ............ 219/130.5 |
| 6,479,793 | B1 | | 11/2002 | Wittmann et al. |

FOREIGN PATENT DOCUMENTS

| JP | 56-158281 | A | * | 12/1981 |
| JP | 11104831 | | | 4/1999 |
| JP | 2000-334566 | A | * | 12/2000 |
| JP | 3287335 | | | 3/2002 |

* cited by examiner

Primary Examiner—Clifford C. Shaw
(74) Attorney, Agent, or Firm—Pearne & Gordon LLP

(57) ABSTRACT

A welding voltage judgment portion 16 of judging to see if a predetermined value of welding voltage inputted from an input device 11 falls within a predetermined certain range is provided, and when the aforementioned welding voltage judgment portion 16 judges that the predetermined value of welding voltage deviates from the certain range, a standard voltage corresponding to the aforementioned inputted predetermined value of welding current is selected from a unitary voltage table portion 19, making it possible to always keep the welding voltage stored in the welding device within a proper voltage range even when the worker inputs conditions deviating from the proper range during the operation of inputting welding conditions.

6 Claims, 2 Drawing Sheets

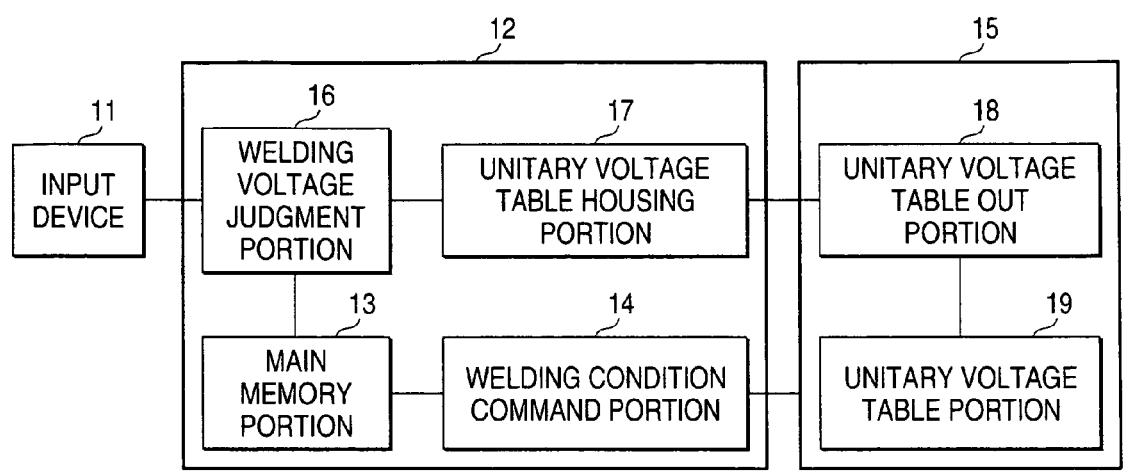

WELDING EQUIPMENT

TECHNICAL FIELD

The present invention relates to a welding device which selects a welding voltage from a unitary voltage table.

BACKGROUND ART

In order to effect consumable electrode arc welding, it is necessary that an electric current corresponding to the thickness of the base material and a proper voltage corresponding to the electric current be set.

Examples of the method of setting these welding conditions include an individual method of individually setting electric current and voltage and a unitary method by which the welding machine automatically sets a proper standard voltage when an electric current is set.

FIG. 3 illustrates a welding device which gives welding command by an individual method and the reference numeral 111 indicates an input device and the reference numeral 112 indicates a control device which controls various units and has a main memory portion 112 and a welding condition command portion 114. The reference numeral 115 indicates a welding device machine. In order to set welding conditions in such a welding device, a predetermined value of welding current and a predetermined value of welding voltage are inputted from the input device 111, and these predetermined values are stored in the main memory portion 113 and then sent from the welding condition command portion 114 to the welding machine 115. Thus, as a command to the welding machine 115 there is used the value inputted as it is, making it necessary for the operator which sets conditions to input an electric current and a proper voltage corresponding to the electric current and hence have an expert knowledge of the relationship between welding current and voltage.

FIG. 4 illustrates a welding device which gives welding command by a unitary method and has a unitary voltage table portion 219 and a welding voltage judgment portion 216 in a welding machine 215. In this welding device, the operator who sets welding conditions sets only electric current value among welding conditions using an input device 211. This electric current value is stored in a main memory portion 213, and the condition which is ordered to the welding machine 215 by a welding condition command portion 214 is only electric current value. When ordered electric current, the welding machine 215 finds out the standard voltage corresponding to the electric current from a unitary voltage table portion 219 in itself and then outputs proper welding conditions composed of the electric current thus given and the voltage found out in the unitary voltage table portion 219. Thus, the unitary method requires that the operator who sets conditions order only electric current value and is advantageous in that no expert knowledge of the relationship between welding current and voltage is needed. As the relationship between welding current and voltage housed as a numerical value table in the unitary voltage table portion 219 there is normally used one prepared by welding machine manufacturers.

Further, as disclosed in Patent Reference 1, a welding electric supply is proposed which operates with a unitary voltage outputting portion of outputting a unitary voltage as a proper voltage command value corresponding to welding current, which unitary voltage outputting portion is provided in an arc welding device such as robot, whereby switching is made from individual method to unitary method or vice versa.

Patent Reference 1: U.S. Pat. No. 3,287,335 (corresponding to U.S. Pat. No. 6,384,375)

DISCLOSURE OF THE INVENTION

Problems that the Invention is to Solve

However, in the case where robot welding conditions are set by the related art unitary method, a proper predetermined value of welding voltage selected from a unitary voltage table is selected as a welding voltage during the setting, but there arose a problem that when this selected predetermined value of welding voltage is changed for some reason, the welding voltage can be difficultly reset to the previous proper predetermined value of welding voltage.

Therefore, an object of the present invention is to provide a welding device capable of setting the predetermined value of welding voltage to a proper value.

Means for Solving the Problems

In order to accomplish the aforementioned object, the present invention comprises a unitary voltage table portion having a table of standard voltage corresponding to welding current housed therein, an input portion of inputting a predetermined value of welding current and a welding voltage judgment portion of judging to see if the predetermined value of welding voltage inputted from the aforementioned input portion falls within a predetermined certain range, wherein when the aforementioned welding voltage judgment judges that the predetermined value of welding voltage deviates from the certain range, the standard voltage corresponding to the aforementioned predetermined value of welding current is selected from the unitary voltage table.

In this arrangement, a welding device can be realized capable of automatically setting a standard voltage based on a unitary voltage table even when the operator sets the welding voltage at a value deviating from the predetermined certain range to register a proper welding voltage corresponding to welding current.

Further, the welding device of the present invention comprises a unitary voltage table portion having a table of standard voltage corresponding to welding current and upper limit voltage and lower limit voltage housed therein, an input portion of inputting a predetermined value of welding current and a predetermined value of welding voltage and a welding voltage judgment portion of judging to see if the predetermined value of welding voltage inputted from the aforementioned input portion falls within the range between the aforementioned upper limit voltage and lower limit voltage, wherein when the aforementioned welding voltage judgment judges that the predetermined value of welding voltage exceeds the upper limit, the upper limit voltage corresponding to the predetermined value of welding current is selected from the unitary voltage table while when the aforementioned welding voltage judgment judges that the predetermined value of welding voltage falls below the lower limit, the lower limit voltage corresponding to the predetermined value of welding current is selected from the unitary voltage table.

In this arrangement, a welding device can be realized capable of registering an upper limit voltage corresponding to welding current when a welding voltage exceeding the upper limit is set while registering a lower limit voltage corresponding to welding current when a welding voltage falling below the lower limit is set in the case where the operator sets a welding voltage deviating from the range between the upper limit and the lower limit.

Advantage of the Invention

As mentioned above, the welding device of the present invention can realize an excellent welding device capable of always keeping the welding voltage stored therein within a proper voltage range even when the operator inputs conditions deviating from the proper range during the operation of inputting welding conditions.

BRIEF DESCRIPTION OF THE DRAWINGS

FIG. 1 is a configurational view of Embodiments 1 and 2 of the welding device of the present invention.

FIG. 2 is a diagram illustrating an example of command structure in an embodiment of the welding device of the present invention.

DESCRIPTION OF REFERENCE NUMERALS AND SIGNS

Figure 3:
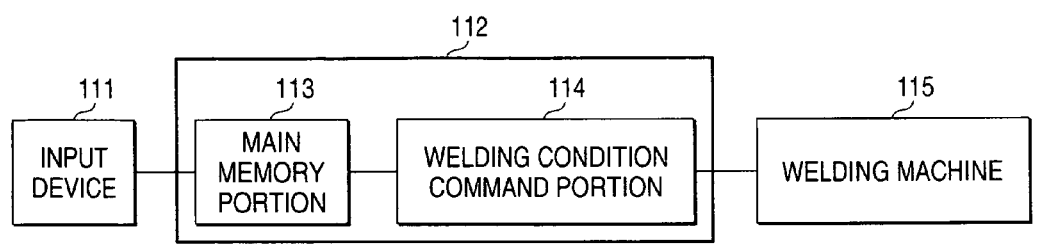
FIG. 3 is a configurational view of a welding device using the related art individual welding condition command method.
Figure 4:
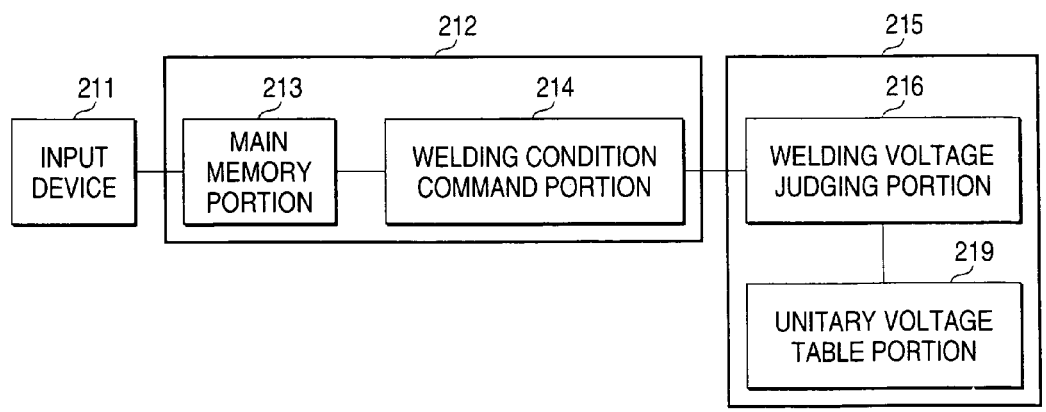
FIG. 4 is a configurational view of a welding device using the related art unitary welding condition command method.

11 Input device
12 Control device
13 Main memory portion
14 Welding condition command portion
15 Welding machine
16 Welding voltage judgment portion
17 Unitary voltage table housing portion
18 Unitary voltage table output portion
19 Unitary voltage table portion

BEST MODE FOR CARRYING OUT THE INVENTION

EMBODIMENT 1

Embodiment 1 of implementation of the present invention will be described hereinafter in connection with FIGS. 1 and 2.

FIG. 1 illustrates an example of a welding device which reproduces stored welding conditions to effect welding, the reference numeral 11 indicates an device of inputting welding conditions such as welding current and welding voltage, the reference numeral 12 indicates a control device of storing welding conditions inputted from the input device 11, reproducing the contents stored and giving a command of welding conditions to the welding machine 15, the reference numeral 16 indicates a welding voltage judgment portion of judging to see if the welding voltage inputted falls within a proper range, the reference numeral 17 indicates a unitary voltage table housing portion having a unitary voltage table housed therein, the reference numeral 18 indicates a unitary voltage table outputting portion of outputting a unitary voltage table to the unitary voltage table housing portion 17 in the control device 12, the reference numeral 13 indicates a main memory portion, the reference numeral 14 indicates a welding condition commanding portion, and FIG. 2 illustrates an example of welding condition command that treats a welding current and a welding voltage as a set.

The operation of the welding device thus arranged will be described.

The input device of FIG. 1 is an ordinary welding condition input device arranged to input command as well as display and confirm the contents stored. When the operator inputs welding conditions using a command in the form shown in FIG. 2, the welding voltage judgment unit 16 judges to see if the predetermined value of welding voltage thus inputted falls within a proper range, and if the predetermined value of welding voltage thus inputted falls within the proper range, the value inputted is housed in the memory portion 13 as it is, while if the predetermined value of welding voltage thus inputted deviates from the proper range, a standard welding voltage corresponding to the welding current inputted is determined by referring to the unitary voltage table housing portion 17 and then housed in the main memory portion 13.

Referring to the proper range of welding voltage, the operator has previously incorporated how much the deviation from the standard welding voltage corresponding to the welding current can be in the welding voltage judgment unit 16 using the input device 11.

Further, the unitary voltage table data housed in the unitary voltage table housing portion 17 has been previously read by the unitary voltage table outputting portion 18 in the welding machine 15.

As mentioned above, in accordance with the present embodiment, in the case where the proper value of welding conditions are unknown, when a value impossible for welding conditions, e.g., 0 volt is inputted, the welding voltage judgment unit 16 judges that it deviates from the proper range and a proper standard welding voltage can then be stored in the main memory portion 13 using the unitary voltage table housing portion 17.

Further, since the contents stored can be confirmed by the input device 11, it is also made possible to confirm the welding voltage which has been actually registered.

In this arrangement, even when the operator sets a welding voltage deviating from the predetermined certain range, a standard welding voltage based on the unitary voltage table can be automatically set, giving an action of registering a proper welding voltage corresponding to the welding voltage without adding to the burden to the operator.

EMBODIMENT 2

The present embodiment has the same configuration as that of the aforementioned Embodiment 1 except that the upper limit voltage and the lower limit voltage corresponding to various welding currents have been registered besides the proper standard welding voltage in the unitary voltage table housing portion 17 in the control device 12, and the description of the configuration of the present embodiment will be omitted.

Firstly, when predetermined values of welding current and welding voltage are inputted in the command form shown in FIG. 2 by the input device 11, it is judged to see if the welding voltage thus inputted falls within the range between the upper and lower limits corresponding to the welding current thus inputted, and if it exceeds the upper limit, the upper limit registered in the unitary voltage table is registered, while if it falls below the lower limit, the lower limit is registered.

The unitary voltage table data and the upper limit voltage and lower limit voltage corresponding to various currents housed in the unitary voltage table housing portion 17 have been previously read by the unitary voltage table outputting portion 18 in the welding machine 15.

As mentioned above, in accordance with the present embodiment, even when welding conditions deviating from the proper range are inputted, conditions falling within a proper range are always registered, making it possible to effect welding even if any abnormal value has been inputted.

While the present invention has been described in detail and with reference to specific embodiments thereof, it will be apparent to one skilled in the art that various changes and modifications can be made therein without departing from the spirit and scope thereof.

The present application is based on Japanese Patent Application (Tokugan 2004-063534) filed on Mar. 8, 2004 and its contents are hereby incorporated by reference.

INDUSTRIAL APPLICABILITY

As mentioned above, the welding device of the present invention can realize an excellent welding device capable of always keeping the welding voltage stored therein within a proper voltage range even when the operator inputs conditions deviating from the proper range during the operation of inputting welding conditions.

The invention claimed is:

1. A welding device comprising:
an input portion of inputting a predetermined value of welding current and a predetermined value of welding voltage;
a unitary voltage table portion having a table of standard voltage corresponding to welding current housed therein; and
a welding voltage judgment portion of judging to see if the predetermined value of welding voltage inputted from the aforementioned input portion falls within a predetermined certain range,
wherein when the aforementioned welding voltage judgment judges that the predetermined value of welding voltage deviates from the certain range, the standard voltage corresponding to the aforementioned predetermined value of welding current is selected from the unitary voltage table.

2. A welding device comprising:
an input portion of inputting a predetermined value of welding current and a predetermined value of welding voltage;
a unitary voltage table portion having a table of standard voltage corresponding to welding current and upper limit voltage and lower limit voltage housed therein; and
welding voltage judgment portion of judging to see if the predetermined value of welding voltage inputted from the aforementioned input portion falls within the range between the aforementioned upper limit voltage and lower limit voltage,
wherein when the aforementioned welding voltage judgment judges that the predetermined value of welding voltage exceeds the upper limit, the upper limit voltage corresponding to the predetermined value of welding current is selected from the unitary voltage table while when the aforementioned welding voltage judgment judges that the predetermined value of welding voltage falls below the lower limit, the lower limit voltage corresponding to the predetermined value of welding current is selected from the unitary voltage table.

3. A welding device comprising:
an input portion of inputting a predetermined value of welding current and a predetermined value of welding voltage;
a welding machine comprising a unitary voltage table portion having a table of standard voltage corresponding to welding current housed therein; and
a control portion having a welding voltage judgment portion of judging to see if the predetermined value of welding voltage inputted from the aforementioned input device falls within a predetermined certain range,
wherein when the aforementioned welding voltage judgment judges that the predetermined value of welding voltage deviates from the certain range, the standard voltage corresponding to the aforementioned inputted predetermined value of welding current is selected from the unitary voltage table portion.

4. The welding device of claim 3, wherein the aforementioned control portion has a unitary voltage table housing portion of reading a unitary voltage table from the unitary voltage table portion provided in the welding machine and storing it therein and the aforementioned standard voltage is selected from the housing portion.

5. A welding device comprising:
an input portion of inputting a predetermined value of welding current and a predetermined value of welding voltage;
a welding machine comprising a unitary voltage table portion having a table of standard voltage corresponding to welding current and upper limit voltage and lower limit voltage housed therein; and
a control portion having a welding voltage judgment portion of judging to see if the predetermined value of welding voltage inputted from the aforementioned input portion falls within the range between the aforementioned upper limit voltage and lower limit voltage,
wherein when the aforementioned welding voltage judgment judges that the predetermined value of welding voltage exceeds the upper limit, the upper limit voltage corresponding to the predetermined value of welding current is selected from the unitary voltage table while when the aforementioned welding voltage judgment judges that the predetermined value of welding voltage falls below the lower limit, the lower limit voltage corresponding to the predetermined value of welding current is selected from the unitary voltage table.

6. The welding device of claim 5, wherein the aforementioned control device has a unitary voltage table housing portion of reading a unitary voltage table from the unitary voltage table portion provided in the welding machine and storing it therein and the aforementioned standard voltage is selected from the housing portion.

* * * * *